United States Patent [19]

Damman

[11] Patent Number: 5,014,425

[45] Date of Patent: May 14, 1991

[54] METHOD FOR MANUFACTURING A SPOKE WHEEL

[75] Inventor: Cornelis C. Damman, Diemen, Netherlands

[73] Assignee: Holland Mechanics, B.V., Purmerend, Netherlands

[21] Appl. No.: 409,232

[22] Filed: Sep. 19, 1989

[30] Foreign Application Priority Data

Sep. 21, 1988 [NL] Netherlands .................. 8802341

[51] Int. Cl.⁵ ............................................ B21F 39/00
[52] U.S. Cl. ................................. 29/894.333; 29/452
[58] Field of Search .................. 29/894.33, 894.331, 29/894.332, 894.333, 452; 301/55; 157/1.55

[56] References Cited

U.S. PATENT DOCUMENTS

| | | | |
|---|---|---|---|
| 1,560,565 | 11/1925 | Graham | 29/894.33 |
| 1,578,215 | 3/1926 | Stoler | 29/894.33 |
| 1,660,319 | 2/1928 | Ash | 29/894.33 |

FOREIGN PATENT DOCUMENTS

| | | | |
|---|---|---|---|
| 523814 | 9/1976 | U.S.S.R. | 29/894.333 |
| 320408 | 10/1929 | United Kingdom | 29/894.332 |

Primary Examiner—P. W. Echols
Attorney, Agent, or Firm—Lorusso & Loud

[57] ABSTRACT

In a method of manufacturing a spoke wheel pre-mounted spokes, prior to finally tensioning them, are loaded under strain of tension by a substantial force and are subsequently unloaded again. This pre-stretching process improves the quality of the wheel. An apparatus for performing this method comprises a frame, coupled survelling arms having diabolo rollers for automatically positioning and centering the spoke wheel in the apparatus, regardless of its diameter, and pressure rollers for loading the premounted spokes of the spoke wheel sideways.

5 Claims, 7 Drawing Sheets

METHOD FOR MANUFACTURING A SPOKE WHEEL

The invention relates to a method of manufacturing a spoke wheel, and also to an apparatus for performing this method.

With the manufacture of a spoke wheel it is customary to first introduce the spoke between the hub and the rim of the spoke wheel and to subsequently tension the spokes, wherein the rim of the spoke wheel is also centered, prior to mounting the tire onto the spoke wheel.

The disadvantage of this known manufacturing method is that, after a short time of use of the spoke wheel, diminutions of tension develop in the spokes. This decrease in spoke tension develops first of all by the flexure of the spoke bend near the flange of the hub, and additionally by the depression of the nipple of the spoke into the rim bed and by an action of the spoke bend biting into the flange of the hub during use. Said decrease in tension does not occur with all of said spokes equally, which leads to a wobble in the spoke wheel, which was well-centered previously. When there exists an unfavourable combination of spoke bend and hub flange, it is possible that during the transport of the complete vehicle, such as a bicycle, from the manufacturer to the dealer such large settlements (diminutions of tension) arise that it is necessary to recenter the spoke wheel.

An object of the invention is to provide a method of manufacturing a spoke wheel, wherein said disadvantage is removed for the greater part.

For this purpose the method according to the invention, is characterized in that premounted spokes, prior to finally tensioning them, are loaded under strain of tension by a substantial force and are subsequently unloaded again.

Due to this "pre-stretching" of the spokes, the spokes settle well in the flanges of the hub and in the rim bed of the rim on one side, while the spokes are stiffened on the other side. As a consequence the diminution of tension of the spokes during the first use of the spoke wheel will be substantially less so that the necessity to retension the spokes is omitted and higher quality wheels are obtained.

A simple method according to the invention is characterized in that the spokes are each loaded sideways, while the hub and the rim of the spoke wheel are retained.

Herewith it is possible, that the spoke wheel is rotated for at least one revolution, and the spokes are loaded successively by a loading means.

Due to this measurement all spokes can be pre-stretched separately with a defined force.

It is advantageous therein to drive the spoke wheel intermittently and to load the spokes during the standstill period of the loading means.

In this way it is possible on one side to exert a large force on the spokes by a single loading means, while on the other side only a little force is necessary to turn the unloaded spoke wheel.

As is mentioned hereinbefore, the invention also includes an apparatus for manufacturing a spoke wheel by using the method described hereinbefore.

According to the invention this apparatus is characterized by a frame; means for positioning the spoke wheel in the apparatus, said means being fixed to the frame; and at least one loading means for loading the premounted spokes of the spoke wheel at least under strain of tension.

The apparatus may be provided with means for relatively rotating the loading means and the spoke wheel about the shaft thereof.

This can be realized in a simple manner by a shaft support for rotatably supporting the spoke wheel through the shaft and hub thereof; drive means for rotating the spoke wheel about the shaft support; and two loading means between which the spoke wheel can be positioned and which are movable to such an extent that they can engage the spokes.

In this way the spoke wheel has to be clamped only once, whereafter the spokes on both sides of the spoke wheel are subsequently loaded by the repective loading means.

It is an advantage therein, if each loading means consists of a pressure roller being rotatable about a rotary shaft standing perpendicularly to the shaft support, and being reciprocatingly movable in a direction parallel to the shaft support.

This pressure roller makes it possible to load two adjacent spokes simultaneously. If the spoke wheel is suspended freely rotatable about its shaft, the pressure roller will have a self-centering action so that the force exerted by the pressure roller will be evenly distributed over both adjacent spokes.

Preferably, the drive means is provided with rim rollers adapted to be positioned from the side onto opposite sides of the rim of the spoke wheel, at least one of the rim rollers being driven by a drive motor.

In this way the drive means also serve for retaining the rim of the spoke wheel sideways during the loading of the spokes by the loading means.

The invention further includes an apparatus for manufacturing a wheel having a rim and a hub, which is characterized by a frame; a rim support for initially supporting the wheel on the rim; a shaft support for eventually supporting the wheel on the hub shaft; and means for centering the wheel with respect to the shaft support, said means being provided with three movable rim centering means equally spaced from the shaft support and being coupled to each other such that their distance from the shaft support remains relatively equal.

Due to these measurements any wheel, irrespective of its diameter, can be centered with respect to the shaft support such that the suspension of the wheel in the apparatus can always take place automatically without adjustment of the apparatus to another wheel diameter.

The invention will hereafter be elucidated with reference to the drawings showing an embodiment of the method and apparatus according to the invention by way of example.

Figure 1:
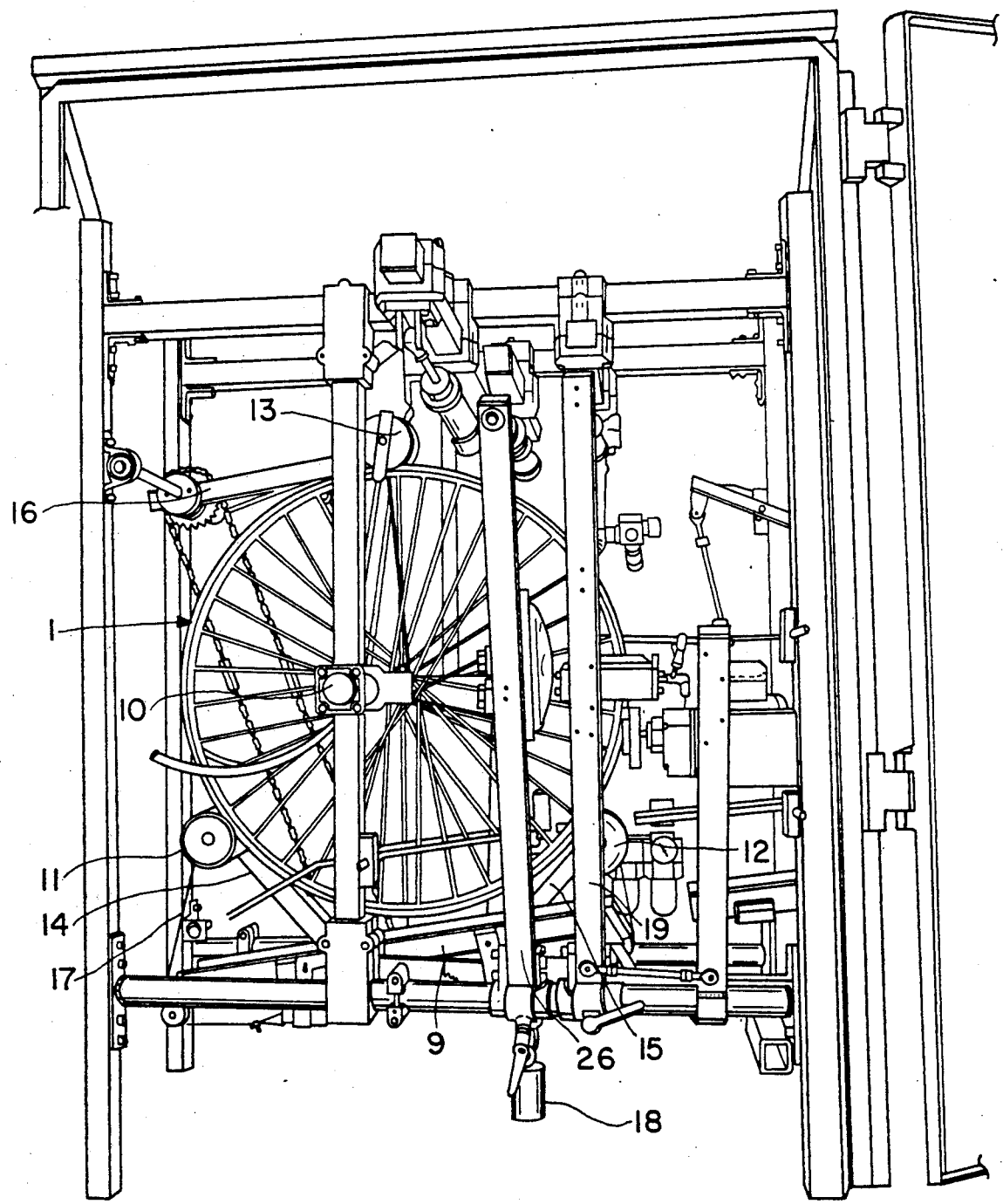
FIGS. 1 and 2 are side views of a part of an apparatus for manufacturing a spoke wheel in accordance with the invention, in different stages.

The drawings show a part of an apparatus for manufacturing a spoke wheel 1 comprising a rim 2, a shaft and hub 3 and a plurality of spokes 4 interconnecting the rim and hub. The apparatus shown will most probably be part of a production line in which the spoke wheels are assembled from the loose parts up to the finished product.

In the apparatus according to the invention the spoke wheels will arrive in a condition in which the spokes 4 are plaited in the wheel 1, but usually not yet tensioned. It is, however, also possible that the spokes are pre-tensioned. The object of the apparatus and the method according to the invention is to "pre-stretch" the spokes 4, thereby enabling the spokes 4 to settle well in the flanges of the hub 3 and the rim bed of the rim 2 in order to prevent the occurence of undesired diminution of tension after the spokes 4 have been tensioned and elimination of centering of the spoke wheel 1. Pre-stretching also causes the spokes 4 to stiffen by plastic deformation thereof. In the case of pretensioned spokes, the tensile stress in the spokes will decrease during the pre-stretching operation so that the spokes have to be tensioned again up to the required level.

The apparatus comprises a frame 5 consisting of plurality of posts 6 and cross beams 7. The frame 5 also includes two parallel stationary shafts 8. In the longitudinal center of the apparatus there is secured to the frame 5 a slightly declining V-shaped channel 9 for allowing the entrance and exit and temporary support of the spoke wheel 1. Guides secure therewith that the spoke wheel 1 does not fall over to the sides.

A shaft support 10 for supporting the shaft in the hub 3 of the spoke wheel consists of two oppositely disposed retractable and extendable shaft clamps for clamping the shaft of the spoke wheel 1. The shaft support 10 extends horizontally and perpendiculary to the direction of conveyance of the spoke wheel 1 through the apparatus.

The apparatus is provided with means for centering the spoke wheel with respect to the shaft support 10. These means comprise three diabolo rollers 11, 12 and 13 each being rotatably provided on a respective swivelling arm 14, 15 and 16. These swivelling arms can be swivelled about shafts extending parallel to the shaft support 10. Further the swivelling arms 14, 15 and 16 are mutually coupled; the swivelling arms 14 and 15 by a gear transmission between the respective shafts, and the swivelling arms 14 and 16 by a chain transmission. The operative length of the swivelling arms—between the axes of the diabolo roller and the pivot shaft—are mutually identical. Furthermore, the swivelling arms 14, 15 and 16 are arranged such that the lines of connection through the axes of the diabolo rollers 11, 12 and 13 form, in their working range, substantially an isosceles trangle having a horizontal base. Since due to the adaptation and coupling of the swivelling arms 14, 15 and 16 the relative distances between the diabolo rollers 11, 12 and 13 on one side and the shaft support 10 on the other side are and remain the same during swivelling movements of the swivelling arms, the engaged spoke wheel 1, regardless of its diameter, will always be centered with respect to the shaft support 10 when the diabolo rollers are moved inwardly. As a consequence, any spoke wheel 1 is allowed to be automatically clamped into the shaft support.

A cable 17 is passed freely over the lower diabolo rollers 11 and 12, said cable 17 being fastened at the one end and being loaded by a weight at the other end, as a consequence of which the cable 17 is always kept taut. The cable 17 has to insure that, when the lower diabolo rollers 11, 12 are moved upwardly, spoke wheels 1 having very small diameters are lifted by the cable 17 before being engaged by the diabolo rollers 11 and 12, thereby preventiong the diabolo rollers 11 and 12 from engaging over and missing a small spoke wheel 1.

It will be understood that the means for centering a spoke wheel with respect to a shaft support could also be used in other stages of manufacturing a spoke wheel, such as in tensioning the spokes or in mounting a tire.

The apparatus according to the invention further includes arms 19 and 20 oppositely disposed on either side of the longitudinal center of the apparatus and each being pivotable about the respective shaft 8 and carrying a rim roller 21, 22 respectively. These rim rollers 21 and 22 are adapted to engage the opposite sides of the rim 2 of the spoke wheel 1. The rim roller 21 is driven by means of an electric motor 23 fixed to an arm 24 which is pivotable about said shaft 8 and being adapted to drive the rim roller 21 by means of a friction roller 25 in order to cause the introduced spoke wheel 1 to turn about its axis.

Besides the arms 19 and 20 of the rim rollers 21 and 22, further swivelling arms 26 and 27 are provided on the shafts 8, said arms 26 and 27 carrying pressure rollers 28 and 29. The pressure rollers 28 and 29 are freely pivotable about shafts, which extend perpendicularly to the shaft support 10, and serve as loading means for the spokes 4 of the spoke wheel 1. By swivelling the arms 26 and 27 inwardly the pressure rollers 28 and 29 are able to engage the spokes 4 of the spoke wheel 1 supported in the apparatus and to load these sideways with a substantial force. This force depends on the type and size of the respective spoke wheel, but it can be on the order of 90 kg.

In the embodiment shown by way of example, the pressure rollers 28 and 29 are made of polyurethane, but also other materials can be used. Of course it should be insured that the spokes 4 are not being damaged by the pressure rollers 28 and 29.

In the embodiment shown by way of example the several (swivelling) arms are actuated by means of pneumatic cylinder-rod assemblies, but of course also other actuating or driving means respectively can be utilized.

Figure 2:
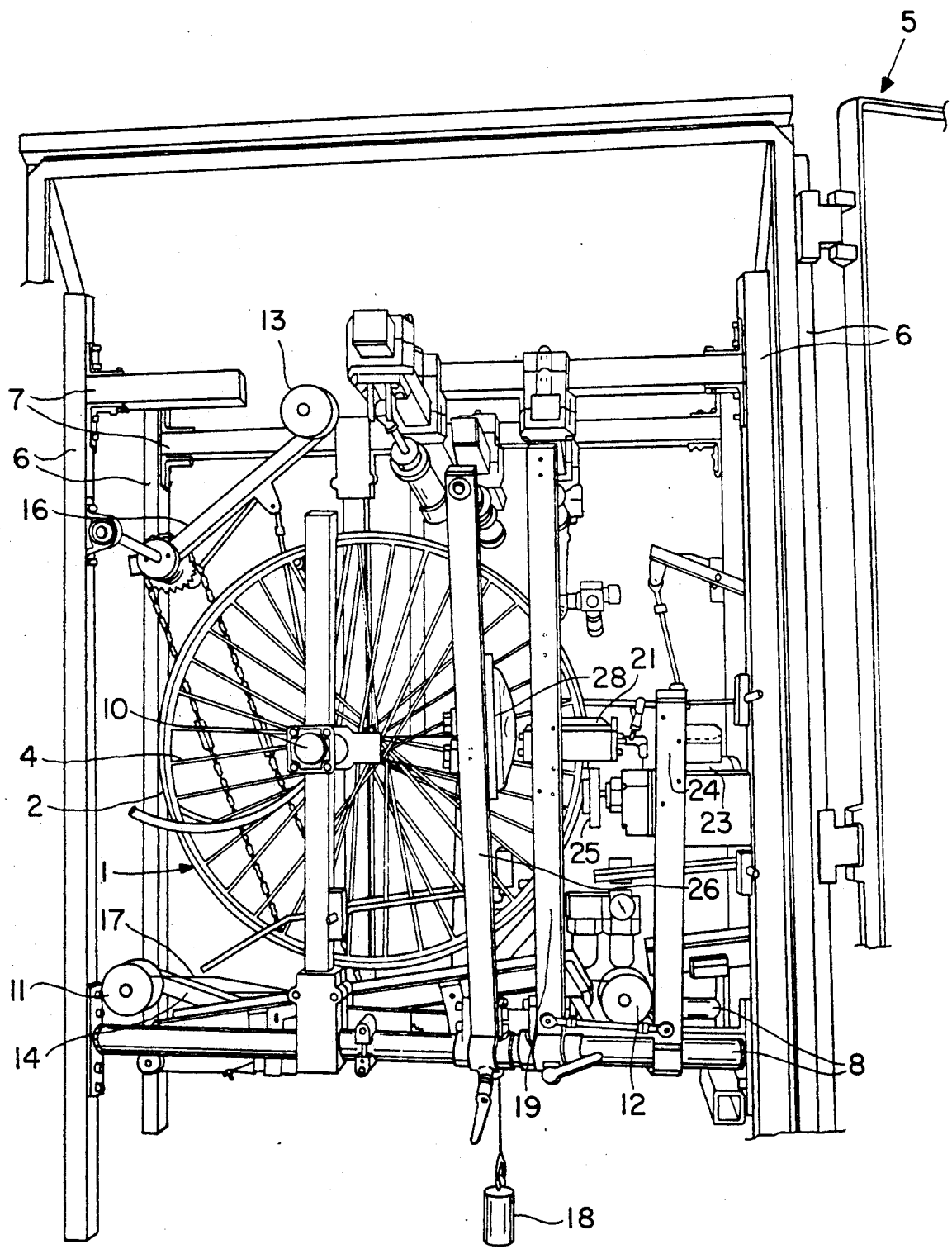
Figure 3:
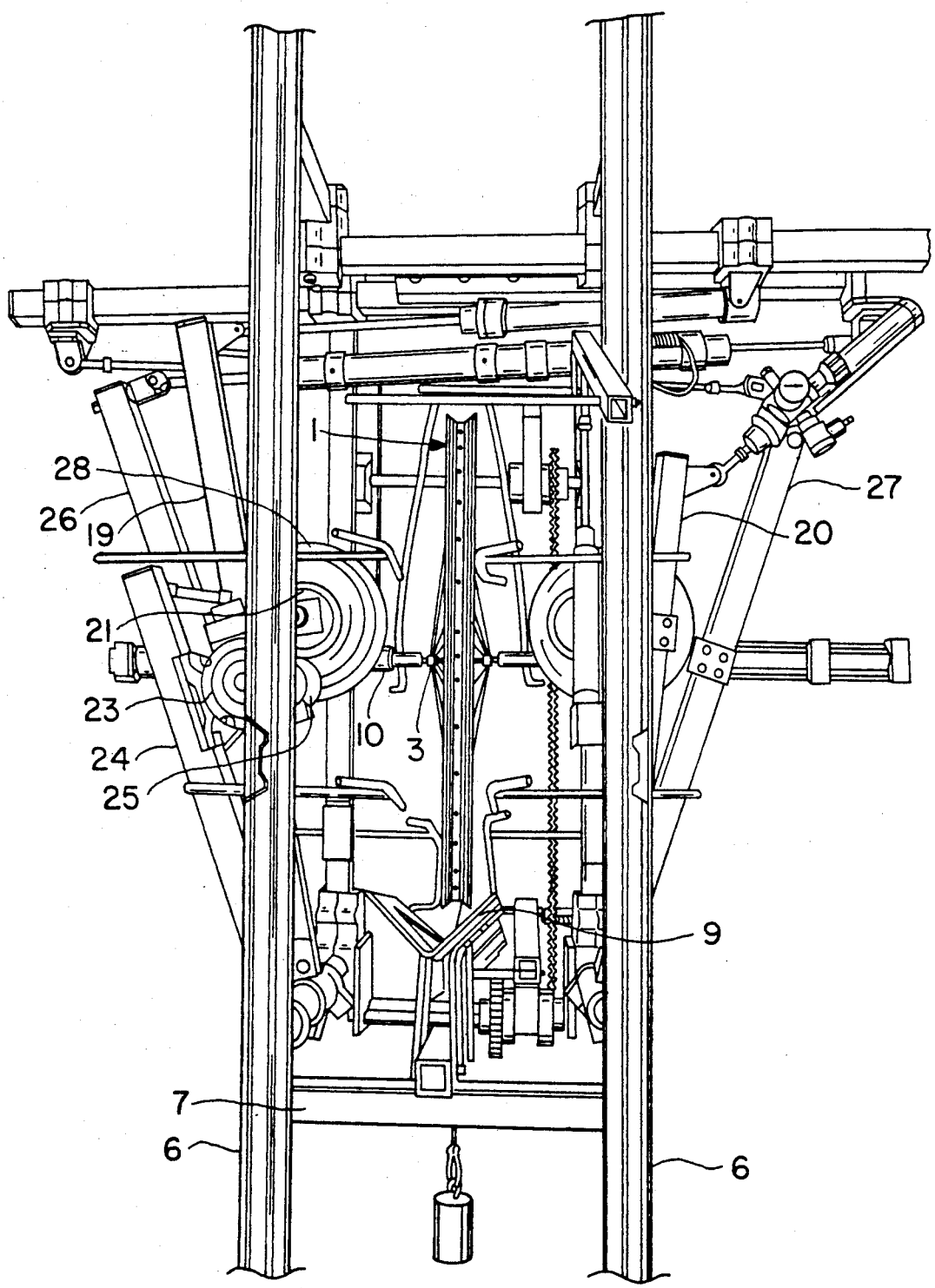
FIGS. 3–6 are front views of the apparatus of FIGS. 1 and 28, in further stages of the process.

The operation of the apparatus shown and described is as follows:

First of all, a spoke wheel 1 is allowed to enter, the spokes 4 of which are not yet finally tensioned. The wheel is received by guides and comes to a stand-still in the V-shaped channel 9 approximately intermediate the upwardly displaced diabolo rollers 11, 12 and 13. Thereafter, the swivelling arms 14, 15 and 16 are simultaneously swivelled inwardly, whereby the spoke wheel 1 is lifted by the diabolo rollers 11 and 12 and is eventually clamped between the three diabolo rollers 11, 12 and 13 such that the shaft of the spoke wheel 1 is aligned with the open shaft clamps of the shaft support 10 (see FIG 1.). Subsequently the shaft support 10 is closed and the swivelling arms 11, 12 and 13 are swivelled back to their initial position so that the spoke wheel 1 hangs freely in the shaft support 10 (see FIGS. 2 and 3).

Figure 4:
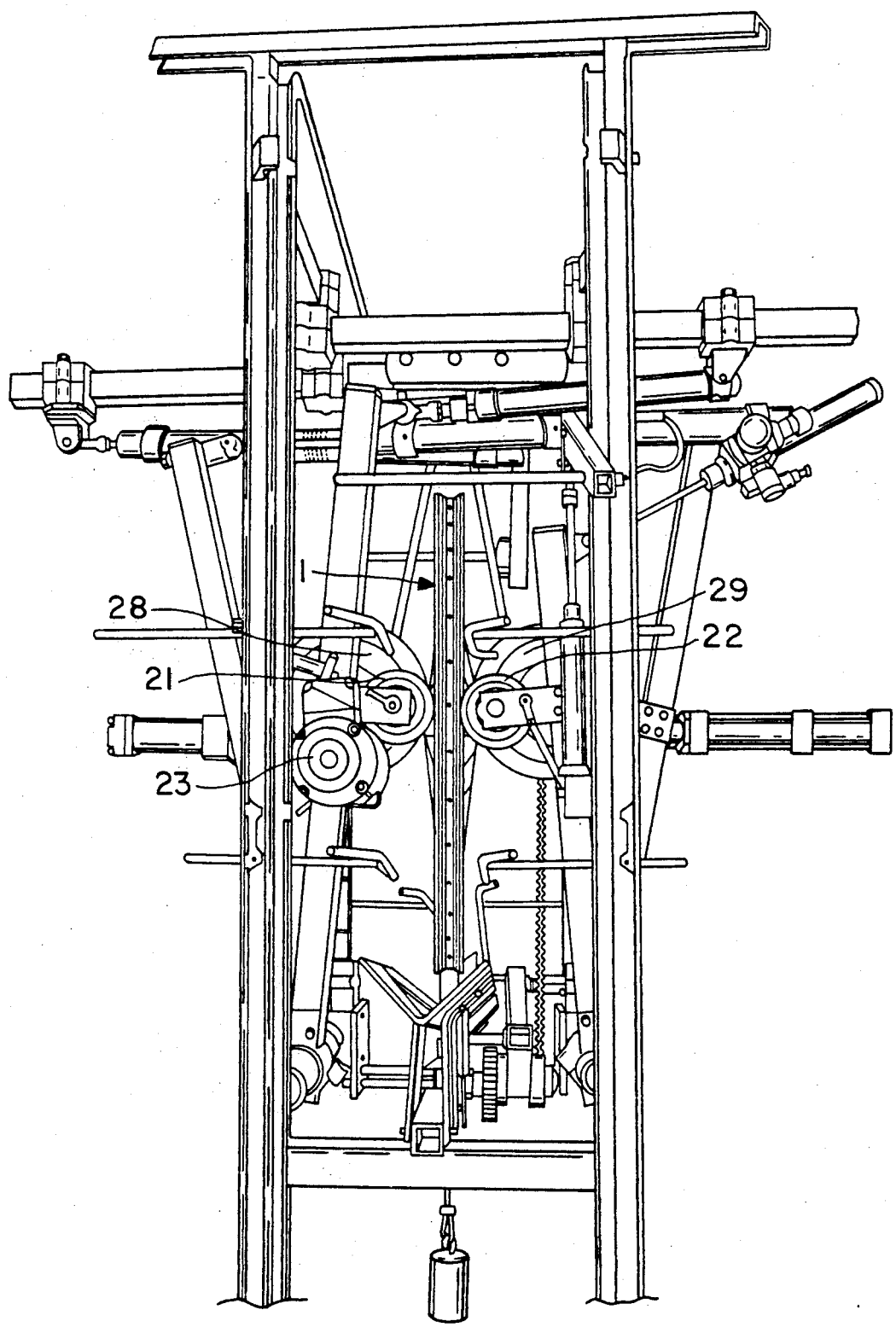
Figure 5:
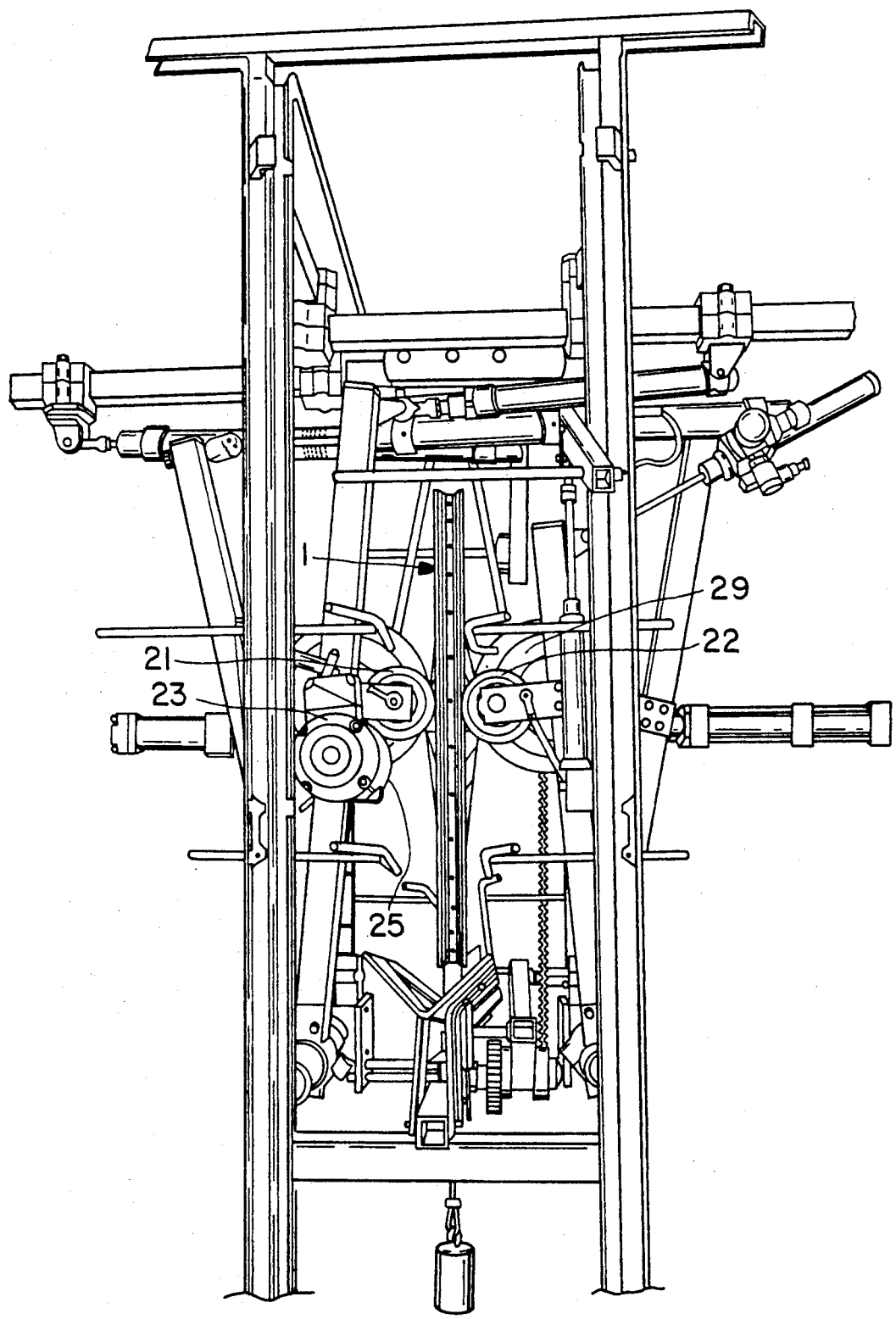
Figure 6:
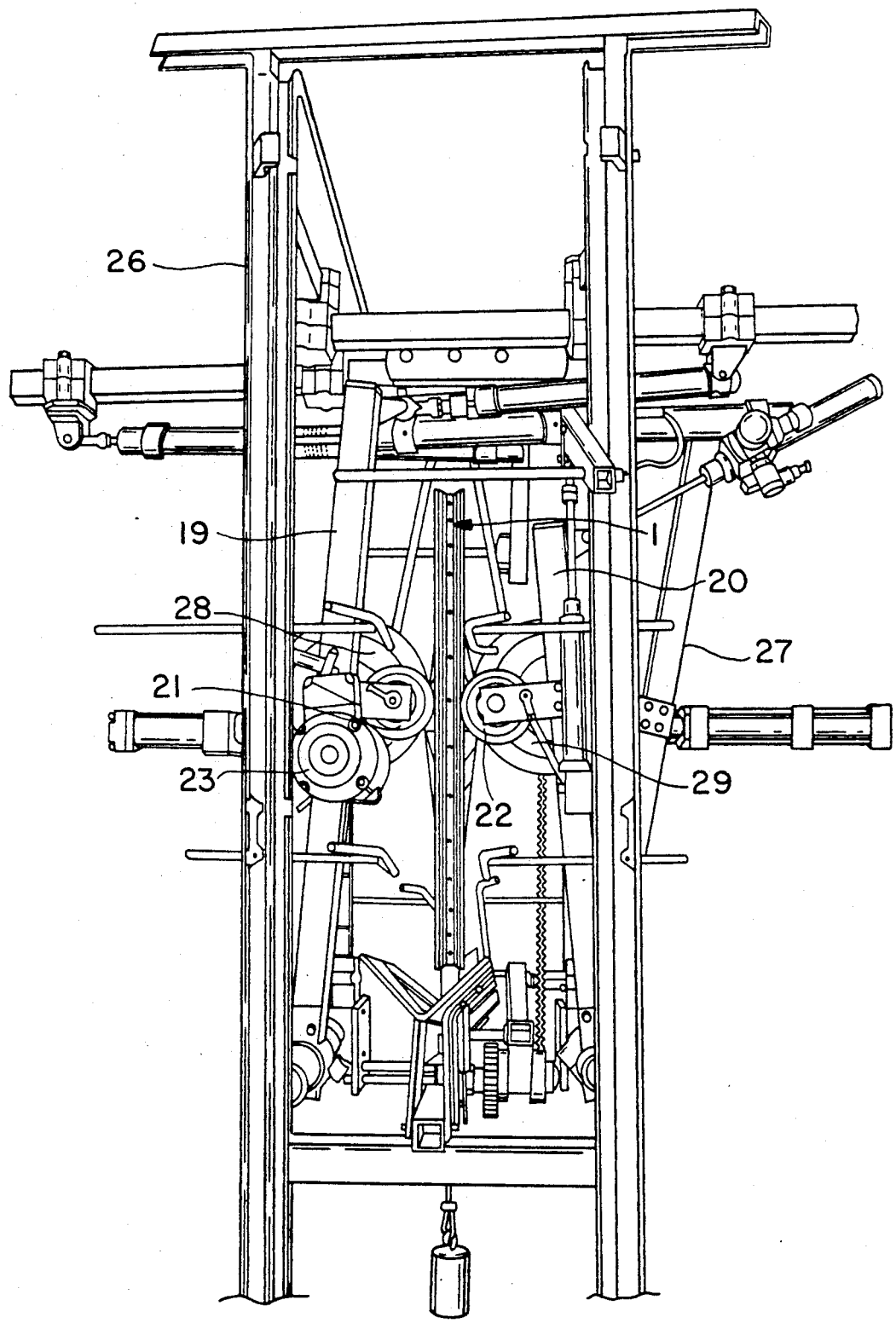
Figure 7:
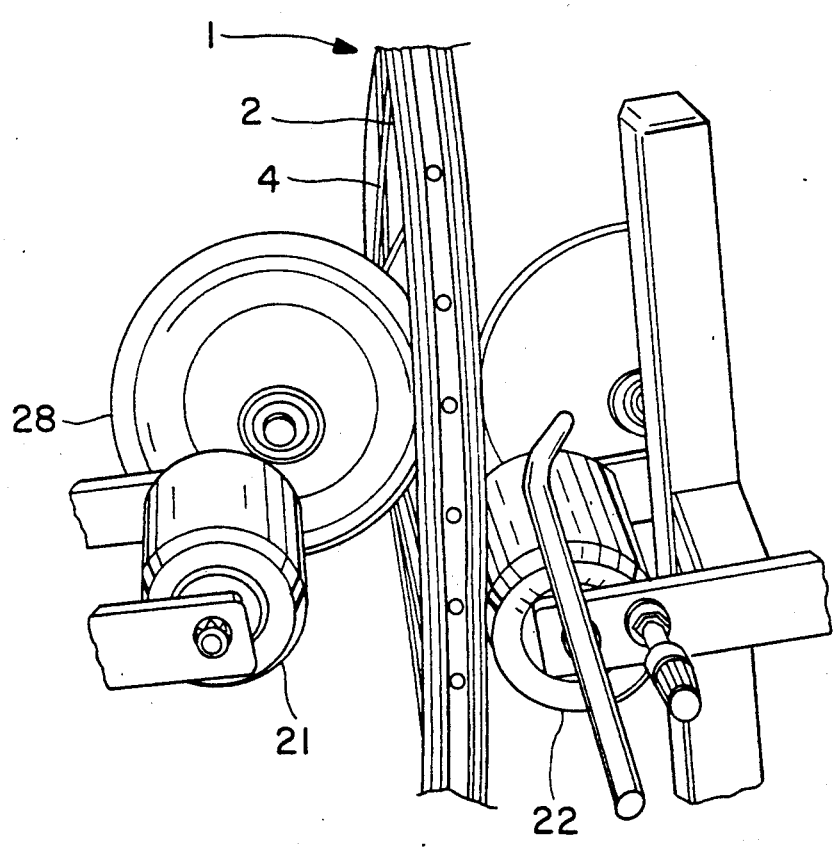
FIG. 7 is an enlarged detail of the apparatus.

Then the arms 19 and 20 are swivelled inwardly such that the rim rollers 21 and 22 engage the respective sides of the rim 2 of the spoke wheel 1 (see FIG. 4). Thereafter one of the pressure rollers 28 and 29—in this case the pressure roller 28—is forced against the spoke wheel 1 due to the swivelling movement of the respective arm 26. As a consequence of the fact that both the spoke wheel 1 and the pressure roller 28 are freely rotatable at that moment, the pressure roller 28 and the spoke wheel 1 rotate such that the pressure roller 28 simultaneously engages two spokes 4 (see FIG. 7) and is loading these sideways with substantially identical forces, whereby the ends of the spokes 4 settle well and the spokes 4 are also stiffened (see FIG. 5). Then the arm 26 and consequently the pressure roller 28 are moved back, while concurrently the friction roller 25 of the electric motor 23 is brought into engagement with the rim roller 21, thereby driving the spoke wheel 1 and turning it about its axis. The spoke wheel 1 is turned to such an extent that the next two spokes 4 are substantially moved in front of the pressure roller 28 whereupon the pressure roller 28 is urged again against the spoke wheel 1. This is continued until all spokes 4 on the respective side of the spoke wheel 1 are loaded by the pressure roller 28. Subsequently the above-mentioned procedure is repeated for the other pressure roller 29 loading the spokes 4 then on that side of the spoke wheel 1 (see FIG. 6).

Finally the spoke wheel 1 is discharged from the apparatus in order to be passed to a subsequent apparatus, such as an apparatus for finally tensioning the spokes.

The invention is not restricted to the embodiment shown in the drawing and described hereinbefore by way of example, which can be varied in different ways within the scope of the invention.

I claim:

1. A method of manufacturing a spoke wheel, having a coaxial hub and rim and a plurality of spokes interconnecting them, wherein premounted spokes, prior to finally tensioning them, are loaded under strain of tension by a substantial force and are subsequently unloaded again.

2. A method according to claim 1, wherein the spokes are each loaded sideways, while the hub and the rim of the spoke wheel are retained.

3. A method according to claim 2, wherein the spoke wheel is rotated for at least one revolution, and the spokes are loaded successively by a loading means.

4. A method according to claim 3, wherein the spoke wheel is driven intermittently, and the spokes are loaded by the loading means during the stand-still period.

5. A method according to claim 3, wherein using one of said successive loadings, two spokes are loaded simultaneously by the same loading means which is centering itself.

* * * * *